United States Patent

Fukushima et al.

Patent Number: 5,083,038
Date of Patent: Jan. 21, 1992

[54] VEHICLE BODY VIBRATION REDUCTION CONTROL APPARATUS

[75] Inventors: Masao Fukushima, Tokyo; Kei Murakami, Zama; Shigeru Kuriyama, Katsuta; Yozo Nakamura, Ibaragi; Yuji Maeda, Katsuta; Kenichi Nakamura, Katsuta; Keiichi Mashino, Katsuta; Yuzo Kadomukai, Ibaragi, all of Japan

[73] Assignee: Nissan Motor Co., Ltd., Japan

[21] Appl. No.: 642,341

[22] Filed: Jan. 17, 1991

[30] Foreign Application Priority Data

Jan. 26, 1990 [JP] Japan .................................. 2-14868

[51] Int. Cl.$^5$ .............................................. H02P 9/14
[52] U.S. Cl. .................................. 290/40 A; 290/40 R; 290/40 C; 322/28; 322/29
[58] Field of Search ............... 290/1 R, 40 R, 40 A, 290/40 C; 322/28, 29

[56] References Cited

U.S. PATENT DOCUMENTS

| | | | |
|---|---|---|---|
| 4,310,793 | 1/1982 | Sheldrake et al. | 322/28 |
| 4,634,954 | 1/1987 | Kato et al. | 322/28 |
| 4,733,159 | 3/1988 | Edwards et al. | 322/28 |

FOREIGN PATENT DOCUMENTS 63-45498  9/1988  Japan .

Primary Examiner—A. D. Pellinen
Assistant Examiner—Robert L. Hoover
Attorney, Agent, or Firm—Lowe, Price, Leblanc & Becker

[57] ABSTRACT

In a vehicle vibration reduction control apparatus for controlling an alternator driven by an engine to charge a battery in such a way that vehicle body vibration due to the engine can be cancelled by alternator vibration, the reference voltage applied to an alternator field coil is reduced by a predetermined value for a predetermined time period, whenever battery terminal voltage exceeds a predetermined level. Since the battery charging rate can be reduced automatically at battery overcharge due to cancellation of engine vibration by alternator vibration, it is possible to prevent the battery from being overcharged when engine vibration increases at idling, for instance.

12 Claims, 3 Drawing Sheets

VEHICLE BODY VIBRATION REDUCTION CONTROL APPARATUS

BACKGROUND OF THE INVENTION

1. Field of the invention

The present invention relates to a control apparatus for controlling a generator in such a way that vehicle body vibration caused by an engine can be cancelled by generator vibration driven by the engine, and specifically to a vehicle body vibration reduction control apparatus suitable for use in passenger cars so as to reduce vehicle body vibration at engine idling, in particular.

2. Description of the Prior Art

An automotive vehicle engine tends to vibrate at low engine speed in general, and particularly the vibration increases at engine idling. To reduce the vehicle body vibration, a vibration reduction control apparatus has been proposed such that torque fluctuations of the engine crankshaft can be reduced by controlling, exciting current for an alternator (provided for charging a storage battery so that the alternator torque can be generated 180 degrees out-of-phase with the engine crankshaft torque whenever engine crankshaft torque fluctuation increases, as disclosed in Japanese Published Examined (Koho) Appli. No. 63-45498.

In this prior-art apparatus, the vehicle body vibration can be cancelled by increasing torque required to drive the generator in such a way that the generator exciting current is increased according to angular positions of the engine crankshaft, while keeping the exciting current pulse at a constant pulse width.

In the prior-art apparatus, however, since the vibration reduction is controlled without due consideration of the battery storage state, there exists a problem in that the storage battery is damaged or the battery life is shortened due to overcharge of the storage battery.

The reason is as follows: in order to reduce the vehicle body vibration when engine speed fluctuates at low engine speed (e.g. idling), since a relatively large engine torque must be cancelled by the generator torque, the torque required to drive the generator increases. Therefore, the generator exciting current is increased to increase the generator output, so that the storage battery is inevitably subjected to be overcharged.

SUMMARY OF THE INVENTION

With these problems in mind, therefore, it is the primary object of the present invention to provide a vehicle body vibration reduction control apparatus which can prevent the storage battery from being overcharged even if the generator torque is increased in order to cancel the vehicle body vibration.

To achieve the above-mentioned object, the present invention provide a vehicle vibration reduction control 25 apparatus for controlling a generator driven by an engine to charge a battery in such a way that vehicle body vibration due to the engine can be cancelled by generator vibration, which comprises: means (14, 9, 10, 11, TR1) for determining a reference voltage applied to the generator to limit generator output according to battery terminal voltage; means (12,17) for detecting battery voltage; and means (18) for controlling said determining means in such a way that the reference voltage applied to the generator can be reduced by a predetermined value for a predetermined period when battery voltage detected by said detecting means exceeds a predetermined voltage level.

The reference voltage determining means comprises: first means (14, TR2) for generating an output voltage proportional to battery terminal voltage; second means (C1, R1, 11, TR1) for outputting a pulse signal to the generator in such a way that the pulse width is inversely proportional to the output voltage of said first means; and third means (9, 10) for detecting crankshaft angular position and generating a trigger signal to said second means when an engine crankshaft reaches a predetermined angular position. The detecting means comprises: fourth means (12) for regulating a battery terminal voltage; and fifth means (17) for generating a trigger signal when battery terminal voltage rises beyond a predetermined voltage regulated by said forth means. The controlling means comprises: sixth means (18) for generating a pulse signal for a predetermined time period when the detected battery terminal voltage exceeds the predetermined voltage level; and seven means (R18, D1) connected between said sixth means (18) and said determining means (14), for applying the pulse signal generated by said sixth means to said determining means (14) to reduce the reference voltage applied to the generator by the predetermined value for the predetermined period.

In the present invention, the battery charging rate can be controllably reduced within a predetermined period, whenever the battery terminal voltage exceeds a predetermined voltage. In the embodiment of the present invention, the battery charging rate is controlled by reducing the reference generator voltage in inverse proportional control relationship between the battery terminal voltage and the generator exciting current.

When engine rotative speed fluctuates violently, for instance at idling, an engine vibrates on the engine mounting portion of the vehicle body, so that the vehicle body vibrates. Therefore, whenever an increase in engine speed fluctuation is detected, it is possible to reduce the vehicle body vibration by generating generator vibration 180 degrees out-of-phase with the vehicle body vibration. This 180° out-of-phase generator vibration can be obtained by increasing power of the generator driven by the engine. In other words, when the field current of the generator is increased to increase the field magnetic flux, since the output voltage of the generator increases in proportion to the rotative speed of the generator, the battery charging current also increases with increasing output voltage of the generator. In other words, since the generator torque is proportional to a product of the field magnetic flux and the output current, and further to the rotative speed, it is possible to obtain generator vibration 180° out-of-phase with the engine vibration.

In this case, when the battery charging current increases, the battery is of course overcharged. Therefore, when the battery terminal voltage exceeds a predetermined voltage, since the battery charging rate is automatically decreased, it is possible to prevent the battery from being overcharged.

For instance, when the battery voltage rises beyond 16 V or more, the battery charging current is reduced down to a predetermined value for 2 seconds. As a result, since the average charging current is reduced, it is possible to prevent overcharge of the storage battery.

DETAILED DESCRIPTION OF THE PREFERRED EMBODIMENTS

An embodiment of the vehicle body vibration reduction control apparatus according to the present invention will be described in more detail hereinbelow.

Figure 1:
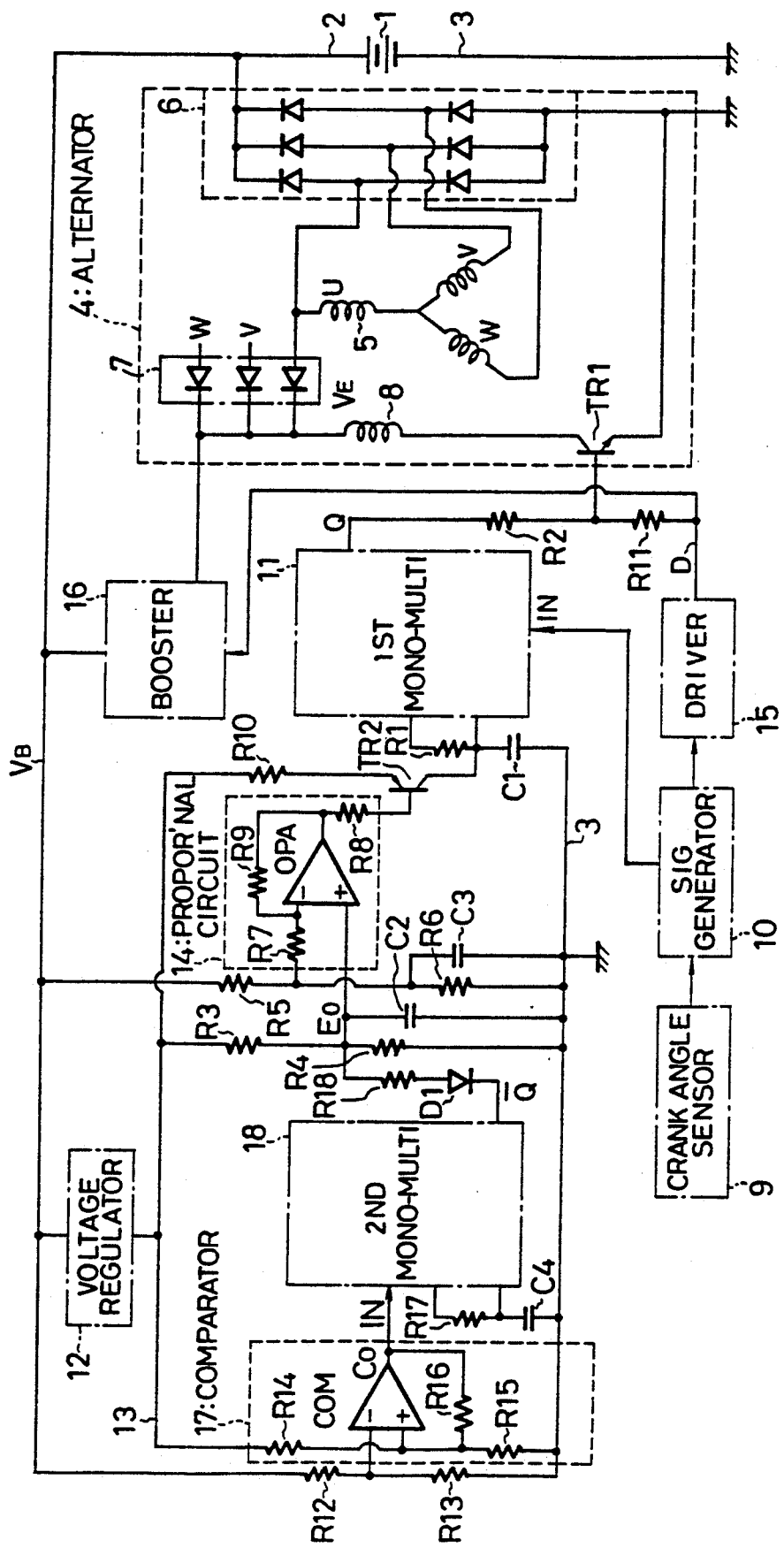
FIG. 1 is a circuit diagram showing an embodiment of the vehicle body vibration reduction control apparatus according to the present invention.

FIG. 1 shows an embodiment of the present invention, in which the present invention is applied to an engine system which uses an alternator as a generator driven by an engine. In the drawing, the control apparatus for controlling the field coil current of an alternator 4 comprises a crankshaft angle sensor 9, a signal generator 10, a signal driver 15, a first monostable multivibrator 11, a booster 16, a voltage regulator 12, a proportional circuit 14, a comparator 17, a second multivibrator 18, etc. Further, a storage battery 1 is connected between a power (battery voltage) supply line 2 and a ground line 3.

The alternator 4 includes an armature coil 5, a diode bridge circuit 6 connected to the armature coil 5 to rectify current generated by the alternator, diodes 7 for rectifying three field currents, a field coil 8, a power transistor TR1, etc. As is well known, when a large field current is passed through the field coil 8, a large torque is required to rotate the armature coil 5 but a large power can be generated through the armature coil 5.

The crankshaft angle sensor 9 generates a crankshaft angular position signal and applies it to a signal generator 10. The signal generator 10 generates a trigger pulse to an input terminal of the first monostable multivibrator 11 whenever the angular position of the engine crankshaft reaches a predetermined position. The substable (turn-on) time of the first monostable multivibrator 11 is determined by a time constant of a resistor R1 and a capacitor C1. An output terminal Q of the first monostable multivibrator 11 is connected to a base of the power transistor TR1 via a resistor R2.

The voltage regulator 12 connected to the battery voltage line 2 supplies a constant voltage to a constant voltage line 13 to activate various electronic circuits.

Two series-connected resistors R5 and R6 are connected between the battery voltage line 2 and the ground line 3. A junction point between the two resistors R5 and R6 is connected to an inversion input terminal of the proportional circuit 14. Two series-connected resistors R3 and R4 are connected between the constant voltage line 13 and the ground line 3. A junction point between the two resistors R3 and R4 is connected to a non-inversion input terminal of the proportional circuit 14 to supply a reference voltage Eo. This proportional circuit 14 is composed of an operational amplifier OPA and resistors R7, R8 and R9.

A capacitor C3 is connected in parallel to the resistor R6 to absorb battery voltage ripples. In the same way, a capacitor C2 is connected in parallel to the resistor R4 to smoothly increase the reference voltage.

A transistor TR2 is connected between the constant voltage line 13 and the capacitor C1 via a resistor R10 in such a way that the collector current can be controlled by an output voltage of the proportional circuit 14.

The operation of the apparatus will be described hereinbelow.

When a predetermined crankshaft angular position is detected, the crank angle sensor 9 generates an angular position signal to the signal generator 10. In response to this signal from the sensor 9, the signal generator 10 applies a trigger pulse to the first monostable multivibrator 11 to turn on the output terminal Q thereof into an "H" level for a substable time period, so that the transistor TR1 is turned on.

Figure 2:
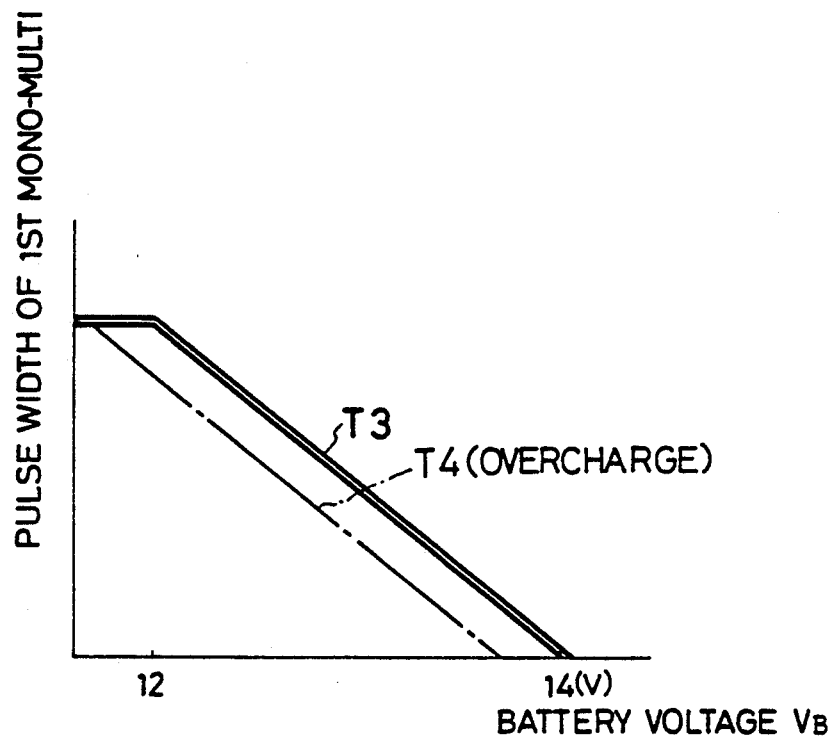
FIG. 2 is a graphical representation showing the relationship between the time constant (i.e. charging pulse width) and the battery voltage in the embodiment of the present invention.

When the terminal voltage $V_B$ of the battery 1 increases due to overcharge, for instance, since $V_B$ is applied to the inversion input terminal of the operational amplifier OPA, the output voltage of the proportional circuit 14 drops. As a result, the base current of the transistor TR2 increases, so that the charging rate to the capacitor C1 increases (C1 is charged quickly). Therefore, the pulse width T3 (i.e. time constant) of the first monostable multivibrator 11 decreases. In contrast with this, when the terminal voltage $V_B$ of the battery 1 decreases, the pulse width T3 (time constant) of the first monostable multivibrator 11 increases. Therefore, the substable (turn-on) time T3 of the first monostable multivibrator 11 is inversely proportional to the battery voltage $V_B$ as shown in FIG. 2.

As described above, since the transistor TR1 is turned on or off by the output Q of the first monostable multivibrator 11, this transistor TR1 is repeatedly turned on or off in synchronism with the engine revolution and additionally the turn-on time T3 of the TR1 is inversely proportional to the terminal voltage $V_B$ of the battery 1. Further, only when this transistor TR1 is on, since an exciting current flows through the field coil 8, it is possible to control an output voltage of the alternator 4. At this moment, a voltage $V_E$ having a pulse width T3 is passed through the field coil 8 as shown in FIG. 3(c).

On the other hand, the engine speed signal outputted from the crank shaft angle sensor 9 is applied to the driver 15 via the signal generator 10. This driver 15 output a pulse signal D as shown in FIG. 3(b) whenever a fluctuation $\Delta N$ of engine speed N exceeds a predetermined value. When this fluctuation signal D is outputted from the driver 15, the transistor TR1 and the booster 16 are both activated, so that a higher exciting voltage is applied to the field coil 8 to pass a larger exciting coil current therethrough.

Figure 3:
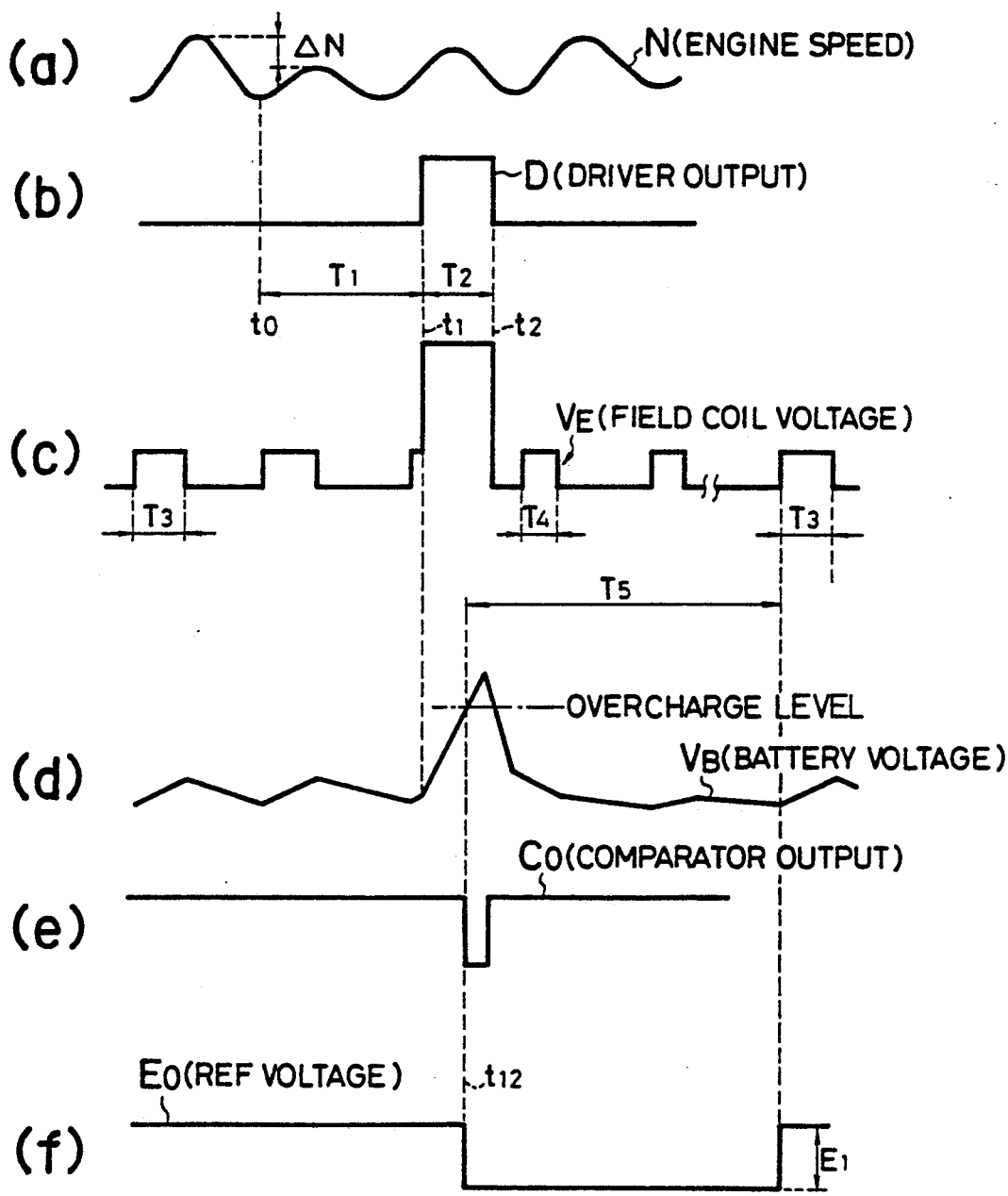
FIG. 3 is a timing chart for assistance in explaining the operation of the embodiment.

The control operation of the driver circuit 15 will be explained hereinbelow with reference to FIG. 3. When fluctuation $\Delta N$ of engine speed N exceeds a predetermined value at a time point $t_o$, the driver 15 outputs a pulse signal D with a pulse width T2 at a time point $t_1$ after a constant time period $T_1$ has elapsed from $t_o$ as shown in FIG. 3(b). As a result, a high voltage is applied from the booster 16 to the field coil 8 between the time points $t_1$ and $t_2$. Therefore, since a larger torque is required for the engine to rotate the alternator 4, the engine speed fluctuation can be effectively suppressed, so that it is possible to reduce the vehicle body vibrations.

On the other hand, when a higher exciting voltage is repeatedly applied to the alternator 4 to reduce the vehicle body fluctuations, the terminal voltage of the battery 1 increases beyond an upper limit as shown in FIG. 3(d), so that the battery 1 is overcharged. This is because the battery 1 is charged by increasing the exciting current passed through the field coil 8 (e.g. between $t_1$ and $t_2$), only to reduce engine speed fluctuations, irrespective of other conditions such as charged-up voltage of the battery 1, power consumption of vehicle electric appliances, etc.

To overcome this problem, the circuit of the present invention comprises the comparator 17 and the second monostable multivibrator 18, as shown in FIG. 1. In more detail, series-connected resistors R12 and R13 are connected between the battery voltage ($V_B$) supply line 2 and the ground line 3, and a junction point between the two resistors is connected to an inversion input terminal of the comparator 17. Further, series-connected resistors R14 and R15 are connected between the constant voltage supply line 13 and the ground line 3, and a junction point between the two is connected to a non-inversion input terminal of the comparator 17 as a reference voltage. Under these conditions, the output voltage $C_0$ of the comparator 17 is set to an "H" level under the normal condition. However, when the terminal voltage $V_B$ rises beyond a predetermined value, the output voltage $C_0$ thereof changes from "H" to "L" level.

The output of the comparator 17 is connected to a trigger input terminal IN of the second monostable multivibrator 18. The substable (turn-on) time T5 of the second monostable multivibrator 18 is determined by a time constant of a resistor R17 and a capacitor C4. Therefore, the second monostable multivibrator 18 is triggered (set) at a time when the output voltage $C_0$ of the comparator 17 drops to "L" level, and then reset at a time when a time period T5 has elapsed. Since the inversion output terminal $\overline{Q}$ of this second monostable multivibrator 18 is connected to a non-inversion input terminal of the proportional circuit 14 via a diode D1 and a resistor R18, the reference voltage $E_0$ applied to the non-inversion input terminal of the proportional circuit 14 drops by a voltage El as shown by FIG. 3(f). This is because although a voltage obtained by dividing the constant voltage on the line 13 by the two resistors R3 and R4 is applied to the non-inversion input terminal of the proportional circuit 14 in the ordinary condition, when the second monostable multivibrator 18 is triggered at battery overcharge, the resistor R18 is connected in parallel to the resistor R4 for a time period T5 (turn-on time).

Therefore, when the field intensity of the alternator 4 is excited strongly by the field coil 8 at the time point $t_1$ as shown in FIG. 3(b), the battery terminal voltage $V_B$ increases gradually after $t_1$ as shown in FIG. 3(d) and exceeds the predetermined overcharge voltage level at a time point $t_{12}$. At this time point $t_{12}$, since the output voltage $C_0$ of the comparator 17 drops as shown in FIG. 3(e), the second monostable multivibrator 18 is triggered to drops the reference voltage $E_0$ by $E_1$ only for a time period T5 as shown in FIG. 3(f). As a result, since the output voltage of the proportional circuit 14 drops (because the non-inversion terminal (+) drops), the time constant of the first monostable multivibrator 11 decreases from T3 to T4 as shown in FIG. 3(c). Further, under these conditions, the pulse width T4 of the first monostable multivibrator 11 also decreases in inverse proportion to the battery terminal voltage $V_B$ as shown by a dot-dashed line in FIG. 2. Therefore, the pulse width of the exciting current passed through the field coil 8 of the alternator 4 is reduced to prevent the overcharge of the battery 1, so that the battery terminal voltage $V_B$ decreases gradually as shown in FIG. 3(d).

Figure 4:
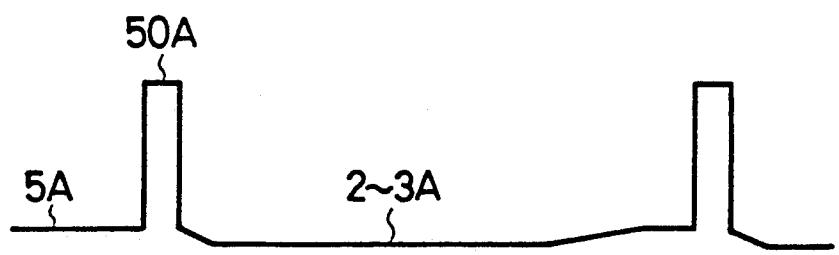
FIG. 4 is a waveform diagram for assistance in explaining the effect of the embodiment of the present invention.

FIG. 4 shows an example of the battery charging current. When engine fluctuations increases under the condition that the battery is being charged by a 5A charge current on an average, the exciting current of the alternator 4 is increased to reduce the vehicle body vibration, so that the charge current increases up to 50A. Under these conditions, since the battery voltage $V_B$ rises, the pulse width of the field coil exciting current is decreased and therefore the battery charge current is kept reduced at about 2 to 3A on an average for a while, with the result that it is possible to sufficiently prevent the battery 1 from being overcharged.

Further, in the above-mentioned embodiment, a digital control method has been explained by which the field coil voltage of the alternator is controlled by varying the pulses width thereof. Without being limited thereto, however, it is of course possible to configure the circuit in analog fashion.

As described above, according to the present invention, it is possible to prevent the battery from being overcharged, when the engine speed fluctuations increase at idling, for instance and therefore the vehicle body vibration is cancelled by the generator driven by the engine.

What is claimed is:

1. A vehicle vibration reduction control apparatus for controlling a generator driven by an engine to charge a battery in such a way that vehicle body vibration due to the engine can be cancelled by generator vibration, which comprises:
   (a) means for determining a reference voltage applied to the generator to limit generator output according to battery terminal voltage;
   (b) means for detecting battery voltage; and
   (c) means for controlling said determining means in such a way that the reference voltage applied to the generator is reduced by a predetermined value for a predetermined period when battery voltage detected by said detecting means exceeds a predetermined voltage level.

2. The vehicle vibration reduction control apparatus of claim 1, wherein said reference voltage determining means comprises:
   (a) first means for generating an output voltage proportional to battery terminal voltage;
   second means for outputting a pulse signal to the generator in such a way that the pulse width is inversely proportional to the output voltage of said first means; and
   (c) third means for detecting crankshaft angular position and generating a trigger signal to said second means when an engine crankshaft reaches a predetermined angular position.

3. The vehicle vibration reduction control apparatus of claim 1, wherein said detecting means comprises:
   (a) fourth means for regulating a battery terminal voltage; and
   (b) fifth means for generating a trigger signal when battery terminal voltage rises beyond a predetermined voltage regulated by said forth means.

4. The vehicle vibration reduction control apparatus of claim 1, wherein said controlling means comprises:
   (a) sixth means for generating a pulse signal for a predetermined time period when the detected battery terminal voltage exceeds the predetermined voltage level; and (b) seventh means connected between said sixth means and said determining means, for applying the pulse signal generated by said sixth means to said determining means to reduce the reference voltage applied to the generator by the predetermined value for the predetermined period.

5. The vehicle vibration reduction control apparatus of claim 2, wherein said first means comprises:

(a) a proportional operational amplifier for generating an output voltage whose level is inversely proportional to battery terminal voltage; and (b) a switching element for passing current in proportion to the output voltage of said proportional operational amplifier.

6. The vehicle vibration reduction control apparatus of claim 2, wherein said second means comprises:

(a) a time constant circuit charged up by the current supplied through said first means; and (b) a first multivibrator for generating the pulse signal on the basis of the time constant circuit in such a way that the pulse width thereof is inversely proportional to the battery terminal voltage.

7. The vehicle vibration reduction control apparatus of claim 2, wherein said third means comprises:

(a) a crankshaft angle sensor for detecting a crankshaft angular position; and (b) a signal generator responsive to said crankshaft angle sensor, for triggering said second means when the crankshaft reaches a predetermined angular position.

8. The vehicle vibration reduction control apparatus of claim 3, wherein said fourth means is a voltage regulator for generating a constant voltage in response to the battery terminal voltage.

9. The vehicle vibration reduction control apparatus of claim 3, wherein said fifth means is a comparator for comparing battery terminal voltage with a reference voltage regulated by said fourth means and outputting a trigger signal when the battery terminal voltage rises beyond the reference voltage.

10. The vehicle vibration reduction control apparatus of claim 4, wherein said sixth means comprises a monostable multivibrator triggered when the detected battery terminal voltage exceeds the predetermined voltage level.

11. The vehicle vibration reduction control apparatus of claim 4, wherein said seventh means is a series-connected resistor and diode.

12. A vehicle vibration reduction control apparatus comprising:

(a) means for cancelling vehicle body vibration due to variations in engine operation by operation of a generator driven by the engine;

(b) said means for cancelling vibrations including control means for controlling the generator to charge a storage battery;

(c) said control means including:

(I) means for determining a reference voltage applied to the generator to limit generator output according to battery terminal voltage;

(II) means for detecting battery voltage; and (III) means for controlling said determining means in such a way that the reference voltage applied to the generator is reduced by a predetermined value for a predetermined period when battery voltage detected by said detecting means exceeds a predetermined voltage level.

* * * * *